T. W. HAMMON.
Wheel-Cultivator.
No. 46,752
Patented Mar. 7, 1865.
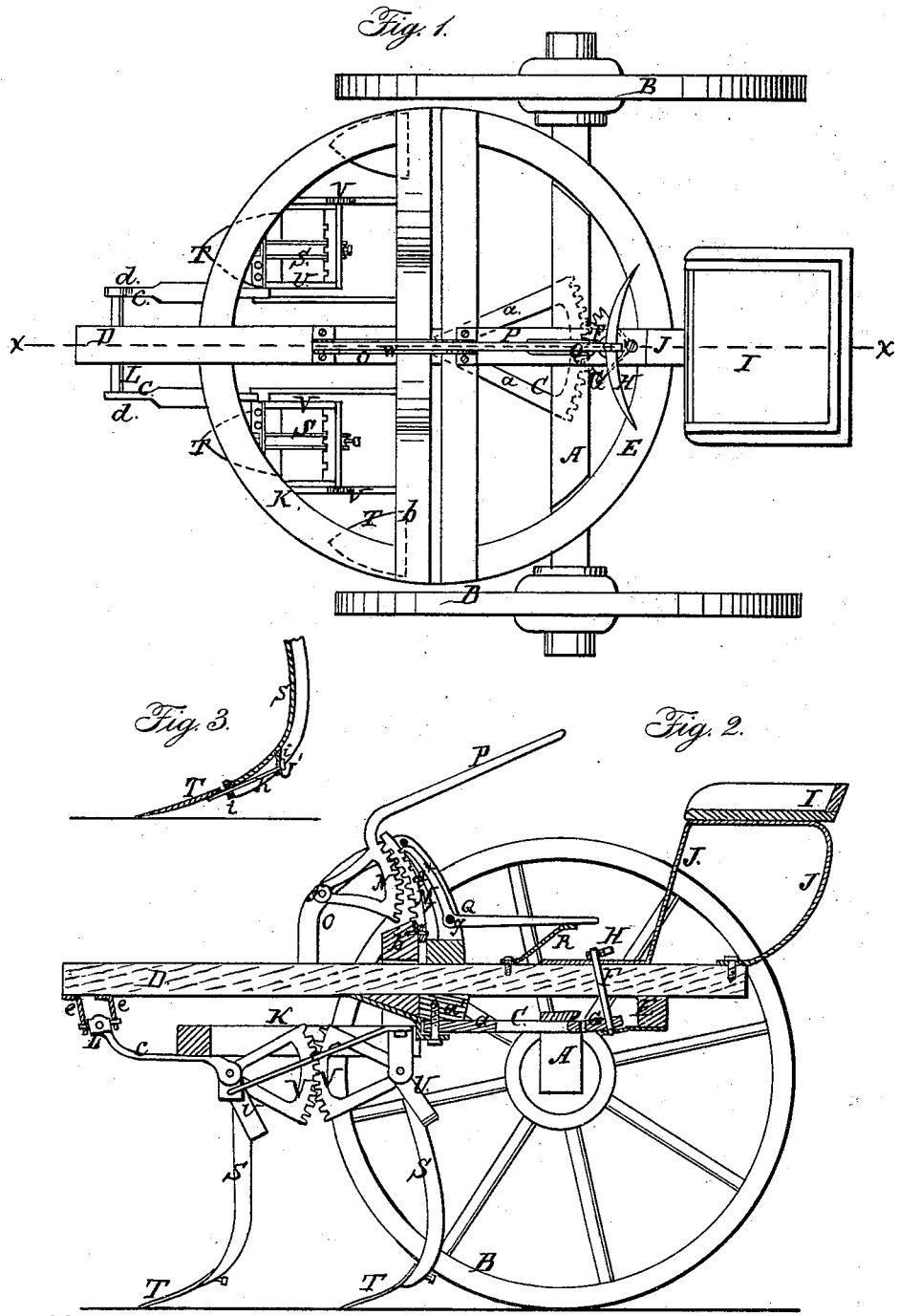

UNITED STATES PATENT OFFICE.

T. W. HAMMON, OF MONTFORT, WISCONSIN, ASSIGNOR TO HIMSELF, JOSEPH H. LINCOLN, S. LINCOLN, AND A. P. HAMMON, OF SAME PLACE.

IMPROVEMENT IN CORN-PLOWS.

Specification forming part of Letters Patent No. 46,752, dated March 7, 1865.

*To all whom it may concern:*

Be it known that I, T. W. HAMMON, of Montfort, in the county of Grant and State of Wisconsin, have invented a new and Improved Corn-Plow; and I do hereby declare that the following is a full, clear, and exact description thereof, which will enable those skilled in the art to make and use the same, reference being had to the accompanying drawings, forming part of this specification, in which—

Figure 1, Sheet No. 1, is a plan or top view of my invention. Fig. 2, Sheet No. 2, is a side sectional view of the same, taken in the line $x$ $x$, Fig. 1; Fig. 3, a vertical section of one of the plows and standards of the same.

Similar letters of reference indicate like parts.

This invention relates to a new and improved machine for plowing corn; and it consists in a peculiar construction and arrangement of the several parts, whereby several advantages are obtained over the ordinary machines now used for such purposes, as hereinafter set forth.

A represents an axle, on which two wheels, B B, are placed loosely, one at each end. This axle has a toothed segment, C, secured permanently to it at its center, the arms $a$ of the segment projecting some distance in front of the axle and being secured at their ends by a pivot-bolt, $a'$, to the under side of the draft-pole D, as shown clearly in Fig. 2. The draft-pole has a semicircular frame, E, secured firmly to it, which is over the axle A, and a shaft, F, passes through the draft-pole and has a toothed segment, G, on its lower end, which gears into the segment C, the upper end of the shaft F having a bar, H, attached to it for the feet of the driver to act against.

I is the driver's seat, secured to supports J at the rear end of the draft-pole D. By this arrangement it will be seen that the driver from his seat I may, by actuating the bar H with his feet, turn the axle A in a more or less oblique position with the line of draft, thereby quickly turning or guiding the machine either to the right or left without depending upon the comparatively slow movement of the team to effect that result. The quick guiding movement of the machine by this adjustment of the axle is due to the pivot-bolt $a'$ being some distance in front of the latter.

K represents a semicircular frame which is constructed similar to the frame E, and is placed directly in front of it, the two frames forming a circle, as shown clearly in Fig. 1. The cross-bar $b$ of this frame K is notched at its under side, so as to fit over and rock freely upon the draft-pole, and to the front part of the frame K there are secured two parallel arms, $c$ $c$, in the front ends of which a shaft, L, is fitted, the latter having a journal, $d$, at the center of its front and rear sides, which journals are fitted in bearings $e$ $e$, attached to the under side of the draft-pole.

To the center of the cross-bar $b$ of the frame K there is attached a toothed segment-bar, M, into which a toothed segment, N, gears, the latter having its pivot $f$ in a frame, O, which is attached to the draft-pole D and frame E. The segment N is provided with a handle, P, for the purpose of actuating it, and the rear side of the segment-bar M has holes $a^x$ made in it to receive the end of a lever, Q, which has its fulcrum-pin $g$ in the frame O and a spring, R, bearing against its under side, said spring having a tendency to keep the lever engaged with said holes. (See Fig. 2.) By depressing the back end of the lever Q, which may be done by the foot of the driver from his seat I, the lever may be freed from the holes in the rack or segment bar M, and by moving the segment N through the medium of the handle B the frame K may be raised and lowered from the shaft L as a center, and said frame K may be held in the desired position by having the front end of lever Q fitted in the proper hole $a^x$.

S represents the standards to which the plows T are attached. These standards are connected to the frame K by means of pendent swinging frames U, connected by toothed segments V. This arrangement, however, forms no part of this invention, it having been applied for separately.

The plows T are attached to the standards S in a novel manner, as follows: Each plow is provided with a cylindrical stem, $h$, (see Fig. 3,) which passes through bearings $i$ at the rear of the standards, and have nuts $j$ on their upper ends above the uppermost bearing $i$. By this arrangement the plows may be adjusted so as to face directly or squarely the line of draft, or they may be adjusted obliquely, so as to throw or cast the earth either to the right or left.

Thus it will be seen that the machine may be quickly turned or guided by moving the axle as described, the plows readily adjusted higher or lower or raised entirely out of the ground by adjusting the frame K, and the plows also allowed to rise and fall to conform to the inequalities of surface over which they may pass in consequence of the lateral swinging movement allowed the frame K, and at the same time a strong, cheap, and durable machine obtained for the purpose.

Having thus described my invention, I claim as new and desire to secure by Letters Patent—

1. The two semicircular frames E K, applied to the draft-pole D in the manner substantially as shown, to form the main frame of the machine.

2. The axle A, connected to the draft-pole D by the pivot-bolt $a'$ in the manner as shown, or in any equivalent way, to operate as herein described.

3. The toothed segments C G, arranged as shown, in connection with the shaft F and bar H, for the purpose of moving or adjusting the axle A, as set forth.

4. The attaching of the plows T to the standards S by means of the stems $h$, fitted in bearings $i$, the former being provided with nuts $j$, and all arranged substantially as described.

5. The method of adjusting and holding the frame K by means of the toothed segment N, segment-bar M, and lever Q, all arranged substantially as set forth.

T. W. HAMMON.

Witnesses:
 THOMAS LAIRD,
 JAMES B. LAIRD.